(12) United States Patent
Feuerman

(10) Patent No.: US 7,574,484 B2
(45) Date of Patent: *Aug. 11, 2009

(54) MANAGING TRANSIENTLY CONNECTED NETWORK CLIENTS

(75) Inventor: Kenneth E. Feuerman, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/837,398

(22) Filed: Aug. 10, 2007

(65) Prior Publication Data

US 2008/0040447 A1 Feb. 14, 2008

Related U.S. Application Data

(63) Continuation of application No. 10/350,699, filed on Jan. 23, 2003, now Pat. No. 7,257,621, which is a continuation of application No. 09/318,377, filed on May 26, 1999, now Pat. No. 6,529,947.

(51) Int. Cl.
*G06F 15/16* (2006.01)
*G06F 15/173* (2006.01)

(52) U.S. Cl. .................................. 709/217; 709/225
(58) Field of Classification Search ............... 709/217, 709/225, 203, 206
See application file for complete search history.

(56) References Cited

U.S. PATENT DOCUMENTS 5,897,260 A 4/1999 Zingher

| 6,167,462 A | 12/2000 | Davis et al. |
|---|---|---|
| 6,209,018 B1 | 3/2001 | Ben-Shachar et al. |
| 6,327,613 B1 | 12/2001 | Goshey et al. |
| 6,332,130 B1 | 12/2001 | Notani et al. |
| 6,442,619 B1 | 8/2002 | Ouellette |
| 6,445,776 B1 | 9/2002 | Shank et al. |
| 6,459,499 B1 | 10/2002 | Tomat |
| 6,529,947 B1 | 3/2003 | Feuerman |
| 6,839,755 B1 | 1/2005 | Kumpf et al. |
| 7,257,621 B1 * | 8/2007 | Feuerman .................... 709/217 |
| 2002/0133573 A1 | 9/2002 | Matsuda et al. |

OTHER PUBLICATIONS

Peterson. "A Yellow-Pages Service for a Local-Area Network", Computer Communications Review, 1988. ACM Press, NY.

Inside Macintosh: Networking, Apple Computer, Inc. (1996), "Networking", 2 pgs. Downloaded from http://developer.apple.com/techpubs/mac/Networking/Networking-2.html.

Inside Macintosh: Networking, Apple Computer, Inc. (1996), "Apple Talk Networking", 7 pgs. Downloaded from http://developer.apple.com/techpubs/mac/Networking/Networking-17.html.

Inside Macintosh: Networking, Apple Computer, Inc. (1996), "The Apple Talk Protocol Stack", 7 pgs. Downloaded from http://developer.apple.com/techpubs/mac/Networking/Networking-19.html.

(Continued)

*Primary Examiner*—Larry D Donaghue
(74) *Attorney, Agent, or Firm*—Fish & Richardson P.C.

(57) ABSTRACT

The present disclosure includes, among other things, systems, methods and program products for delivering data over a computer network.

32 Claims, 5 Drawing Sheets

OTHER PUBLICATIONS

Inside Macintosh: Networking, Apple Computer, Inc. (1996), "Using NBP", 2 pgs. Downloaded from http://developer.apple.com/techpubs/mac/Networking/Networking-63.html.

Inside Macintosh: Networking, Apple Computer, Inc. (1996), Registering Your Entity With NBP:, 5 pgs. Downloaded from http://developer.apple.com/techpubs/mac/Networking/Networking-64.html.

Inside Macintosh: Networking, Apple Computer, Inc. (1996), "Handling name Table Entry Requests", 8 pgs. Downloaded from http://developer.apple.com/techpubs/mac/Networking/Networking-65.html.

Hewlett-Packard Co., "HP Digital Sender 8100C-Managin Personal E-mail Distribution Lists", (1999), 4 pgs. Downloaded from www.HP.com/sposupport/scanners/support_doc/bps50035.html.

Orfali et al., "The Essential Client/Server Survival Guide", John Wiley & Sons, Inc. (1996), pp. 167-426.

* cited by examiner

MANAGING TRANSIENTLY CONNECTED NETWORK CLIENTS

CROSS-REFERENCE TO RELATED APPLICATIONS

This application is a continuation of and claims priority to U.S. application Ser. No. 10/350,699, filed on Jan. 23, 2003, which is a continuation of U.S. application Ser. No. 09/318,377 (now U.S. Pat. No. 6,529,947), filed on May 26, 1999.

BACKGROUND

The present invention relates generally to the management of transiently connected network clients.

Each device connected to a computer network is typically assigned a unique machine-readable internet protocol (IP) network address. In addition, if the device is a computer, each individual application or client running on the computer that receives data over the network is assigned a specific "port". To direct data through the network to the client, a device needs to determine the IP network address and port of the receiving application. Since the machine-readable IP network addresses are complex and difficult to remember, distribution schemes typically employ an associating function, such as a table, to associate a name, i.e., a human language name understood by an administrator or user, with the machine-readable IP network address. The association function is conventionally maintained on a network server.

One problem with data delivery to a network client is that conventional distribution schemes do not automatically handle transient clients, e.g., applications that are only intermittently active on a computer or devices that are connected only intermittently to the network. If the particular client is inactive or is not connected to the network, there will be an error when the device attempts to send data to the client. In addition, if the IP network address for the client changes, a human administrator must manually alter the association table. Although this system is practical if the IP network address for each device is fixed, many network systems do not assign fixed IP network addresses. The administration of such networks can become prohibitively expensive.

A specific example of this problem occurs in the distribution of data from a scanner to a workstation over a computer network. A computer network installed at a commercial business office typically includes a large number of workstations, e.g., one workstation for each employee, but a more limited number of scanners, e.g., one scanner per floor. If a user wishes to direct output from the scanner to a specified application at a specified workstation, the scanner or the computer to which the scanner is connected must be programmed by a human administrator with the IP address of the workstations and the port number of the application.

In view of the foregoing, it would be advantageous to provide a system which enables electronic output to be directed to transient clients on a network with minimal administrator maintenance.

SUMMARY

In one aspect, the invention is directed to a method of delivering data over a computer network. In the method, a name service runs on a first computer connected to a computer network, a request is received at the first computer from a subscriber on a second computer connected to the computer network for registration on the name service, and data is received at the first computer from a data resource. The request includes a name and an associated internet protocol network address and port number. The name from the request is displayed in a list of names on a display coupled to the first computer and located near the data resource, user input is received from an input device coupled to the first computer to select the name from the list, and the data is directed from the resource to the internet protocol network address and port number associated with the selected name so that the data is received by the subscriber on the second computer.

Implementations of the invention may include the following. A subscription program may run on the second computer to identify the name service to which a registration request should be sent and the name to be sent in the request. A request for an internet protocol address may be sent from the second computer to a network server, and the second computer may receive the internet protocol address from the network server. A request for registration containing the internet protocol address received from the network server may be directed from the second computer to the name service identified in the subscription program. The step of directing the request may be performed automatically when the second computer is started or the user logs on. A subscription program may run on the second computer to receive the data from the scanner from the first computer. The subscription program may identify an application on the second computer to which the data should be sent. The data may be received from the first computer at the second computer, and the data may be directed to the application on the second computer identified by the subscription program. The data resource may be a scanner. The data resource, display, input device and the first computer may be located at a kiosk station, and the second computer may be located at a user station. A user may generate data with the data resource at the kiosk station, selects the name representing the second computer used by the user, and move to the user station. A request to direct data to the second computer may be initiated at the data resource. The name service may be a CORBA Name Service.

In another aspect, the invention is directed to a method of delivering data over a computer network in which a subscription agent is run on a first computer connected to a computer network, and a request is sent from subscription agent on the first computer to a name service on a second computer connected to the computer network for registration on the name service. The request includes a name and an associated internet protocol network address and port number. Data is received in the first computer through the IP address and port number from a data resource connected to second computer, an application designated by the subscription agent is opened, and the data is directed to the application.

Implementations of the invention may include the following. The application may be opened on the first computer.

In another aspect, the invention is directed to a method of delivering data over a computer network in which a CORBA name service is run on a first computer connected to a computer network at a kiosk station, and a subscription agent is run on a second computer connected to the computer network at a user's station. A request is sent from the subscription agent on the second computer to a name service on the first computer for registration on the name service. The request includes a name and an associated internet protocol network address and port number. The request is received at the name service on the first computer. Data is received from a data resource connected to the first computer, the name from the request is displayed in a list of names on a display at the first computer, and user input is received at the first computer selecting the name from the list. The data is directed from the resource to the internet protocol network address and port number associated with the selected name so that the data is received by the subscriber on the second computer, an application is opened in the second computer designated by the subscription agent, and the data is directed to the application in the second computer.

In another aspect, the invention is directed to a computer system. The computer system has a computer network, a kiosk station that includes a data resource, a display, and an input device, a first computer connected to the network and coupled to the data resource, display and input device, the first computer running a name service, and a user station that includes a second computer connected to the network. The second computer runs a subscription agent that sends a name and an associated internet protocol address and port number to the name service. The first computer is configured to receive data from the data resource, display a list of names on the display, receive user input selecting the name from the list, and direct the data to the internet protocol address and port number associated with the name so that the data is received by the subscription agent on the second computer.

Advantages of the invention may include one or more of the following. Electronic output can be directed from a network device, e.g., a scanner, to a transient network client, e.g., a workstation. Specifically, a list of subscribers to the network device can be maintained automatically without administrator supervision. A user can select one of the subscribers from the list and send the electronic output from the device to the selected subscriber.

Other features and advantages of the invention will become apparent from the following description, including the drawings and the claims.

DETAILED DESCRIPTION

When data is "pushed" from a data resource to a computer over a network, the initiative or request to transfer data originates from the data source rather than the receiving computer. One technique for pushing data is electronic mail. Unfortunately, there are several problems with relying solely on email to push data. First, electronic mail servers frequently have restrictions on the size of electronic mail. Second, the recipients' folders can become "jammed", i.e., filled with an inconvenient number of messages. The present invention is intended to provide an additional convenient mechanism for pushing data from a shared data resource to other computers over a network.

Figure 1:
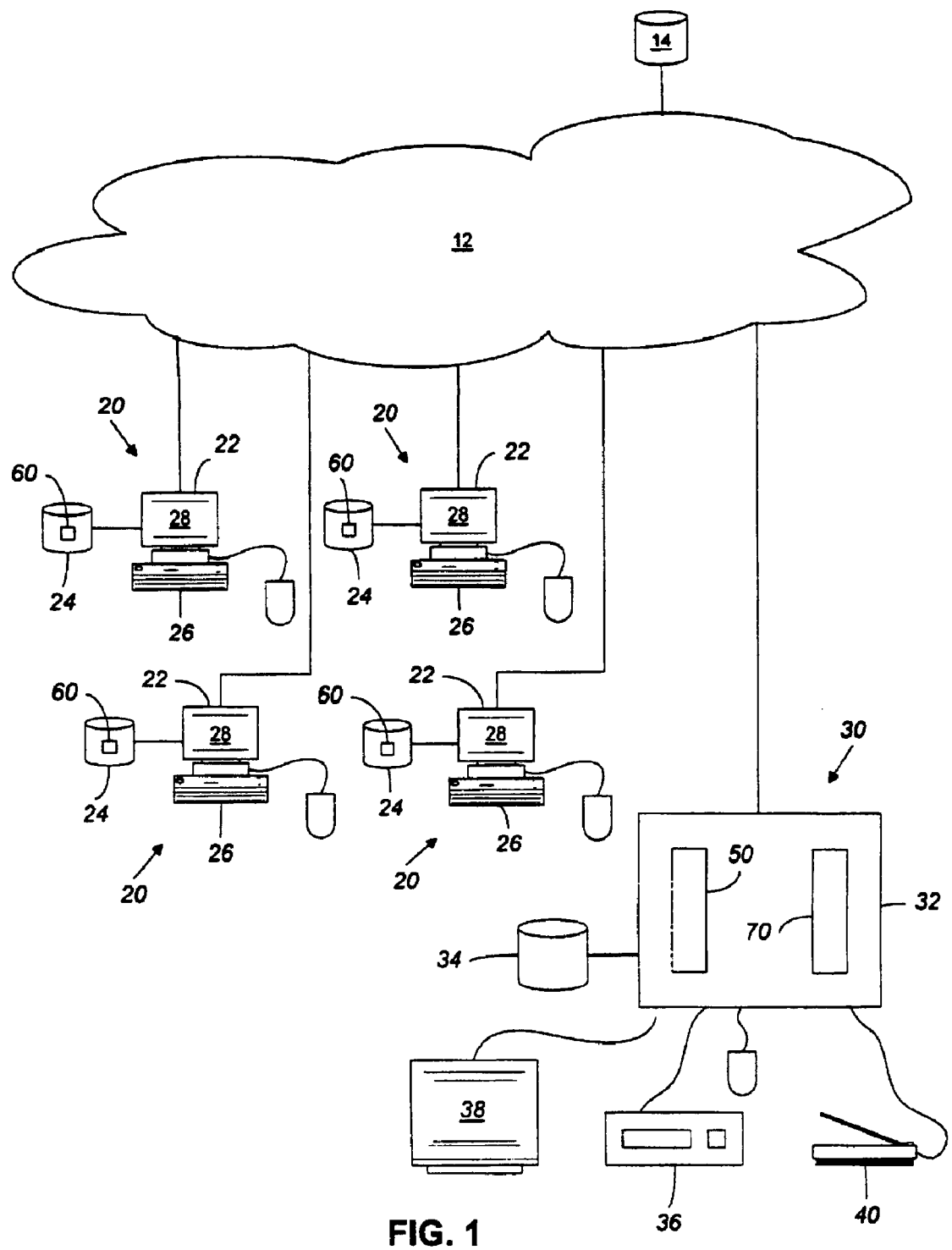
FIG. 1 is a schematic diagram of a computer network that implements the present invention.

As shown in FIG. 1, a computer system 10 includes computer workstations 20 connected by a network 12, such as a local area network (LAN) or a wide area network (WAN). There may be tens or hundreds of workstations 20 in the computer system 10. Each workstation 20 includes a general purpose programmable computer 22, a mass storage device 24 such as a hard drive, an input device 26 such as a keyboard or mouse, and a display 28. The network 12 typically includes a server system 14 to manage the network.

The workstations 20 are "transient" clients of the network 12, i.e., they are connected intermittently to the network 12. When a particular workstation 20 is activated, a startup program stored on the mass storage device 24 contacts the network server 14 and requests an internet protocol (IP) network address.

Most of the workstations are located at user stations, e.g., users' offices or cubicals, but at least one of the workstations is designated as a kiosk station 30, e.g., a stand-alone station that is not assigned to a particular user but can be accessed by many users. For example, the kiosk station 30 may be located in the copy room, hallway, or other shared area of the building. The kiosk station 30 includes a scanner 40 for scanning documents and generating image data, a display 38, and an input device 36 such as a keyboard or mouse, for accepting user input. The scanner 40, display 38 and input device 36 can be coupled to a general purpose programmable computer 32 with a mass storage device 34, such as a hard drive. The computer 32 can be located at the kiosk station 30, or the scanner 40, display 38 and input device 36 could be coupled to the computer 32 over the network 12. The computer 32 need not be a full-fledged workstation, but must have sufficient computing power to run the equivalent of a CORBA Name Service. Other sorts of data resources, i.e., a hardware devices to generate data, such as digital cameras or floppy disk drives, may be located at the kiosk 30 and coupled to the computer 32.

The computer 32 at the kiosk 30 runs a name service program 50, and the computer 22 of each workstation 20 runs a subscription program 60 that communicates with the name service program 50. The name service automatically maintains an association function that associates human-readable names with the IP network addresses and port numbers of the subscription programs 60 on the workstations. Specifically, the name service 50 is configured to listen for requests for registration or deregistration from the workstations. When the name service receives a request, it adds the name, IP network address and port number of the workstation to the association function The name service can be a distributed object-oriented architecture name service that is a widely accepted standard. Specifically, the name service can be a Common Object Request Broker Architecture (CORBA) Name Service, such as the "omniNames" Naming Service available with omniORB. A CORBA name service includes an object for each subscription program that encapsulates IP address of the workstation, the port number of the subscription program, and "interface information", such as the available methods for delivering data to the subscription program represented by the object. The name service 50 can be installed at the kiosk 30 by a human system administrator.

Figure 2:
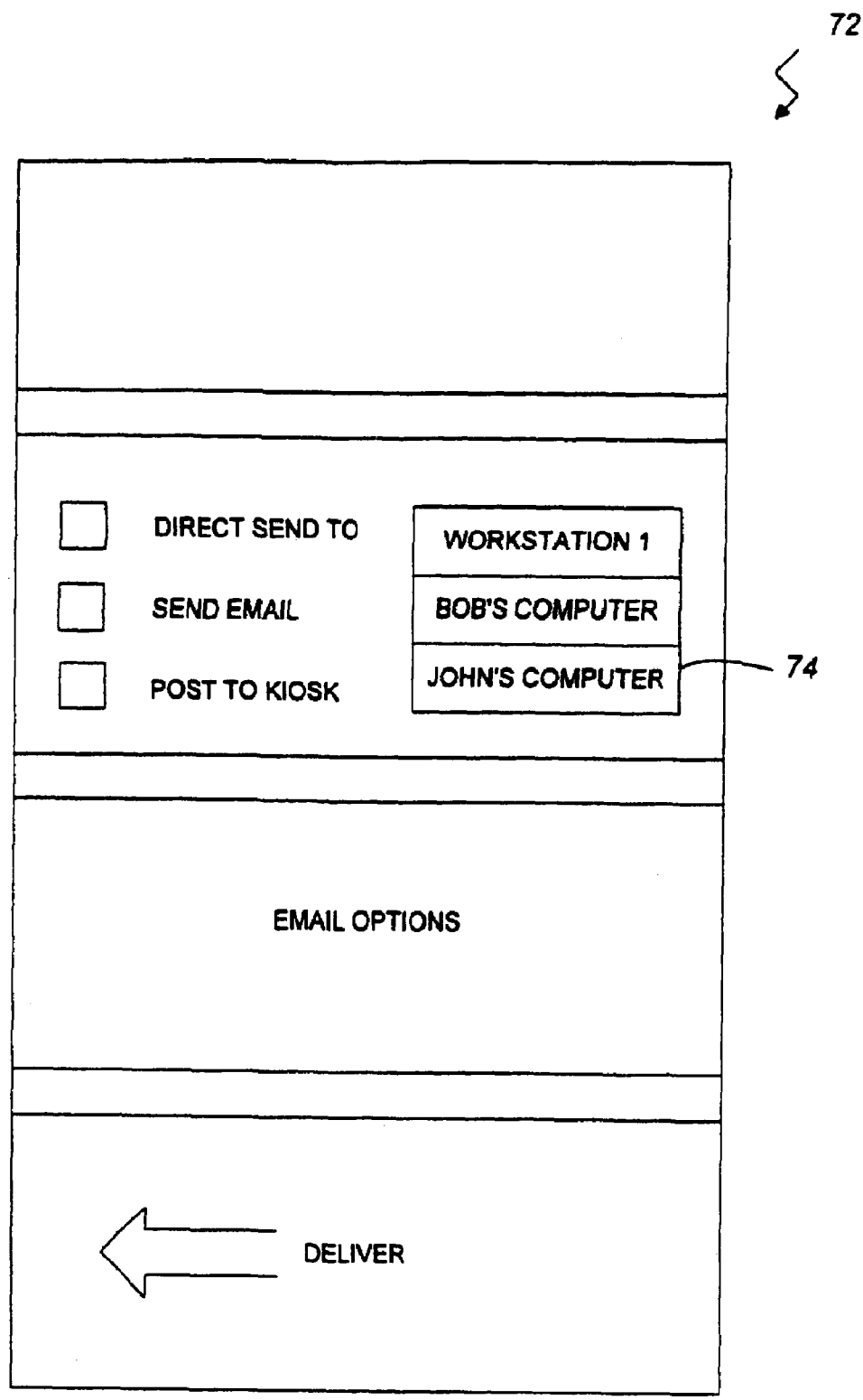
FIG. 2 is a schematic illustration of a graphical user interface at a kiosk station.

The computer 32 at the kiosk 30 also runs a data delivery program 70. As shown in FIG. 2, the data delivery program displays a graphical user interface with a delivery option panel 72. The delivery option panel 72 includes a drop-down list box 74 that lists the human-readable names of the workstations that are currently subscribed to the kiosk, i.e., the names from the association function maintained by the name service. The user can select one of the names from the drop-down list, and the data delivery program will direct the data file from the scanner to the IP address and port number of the workstation that is associated with the human-readable name. The data delivery program can also be installed by a human administrator.

Figure 3:
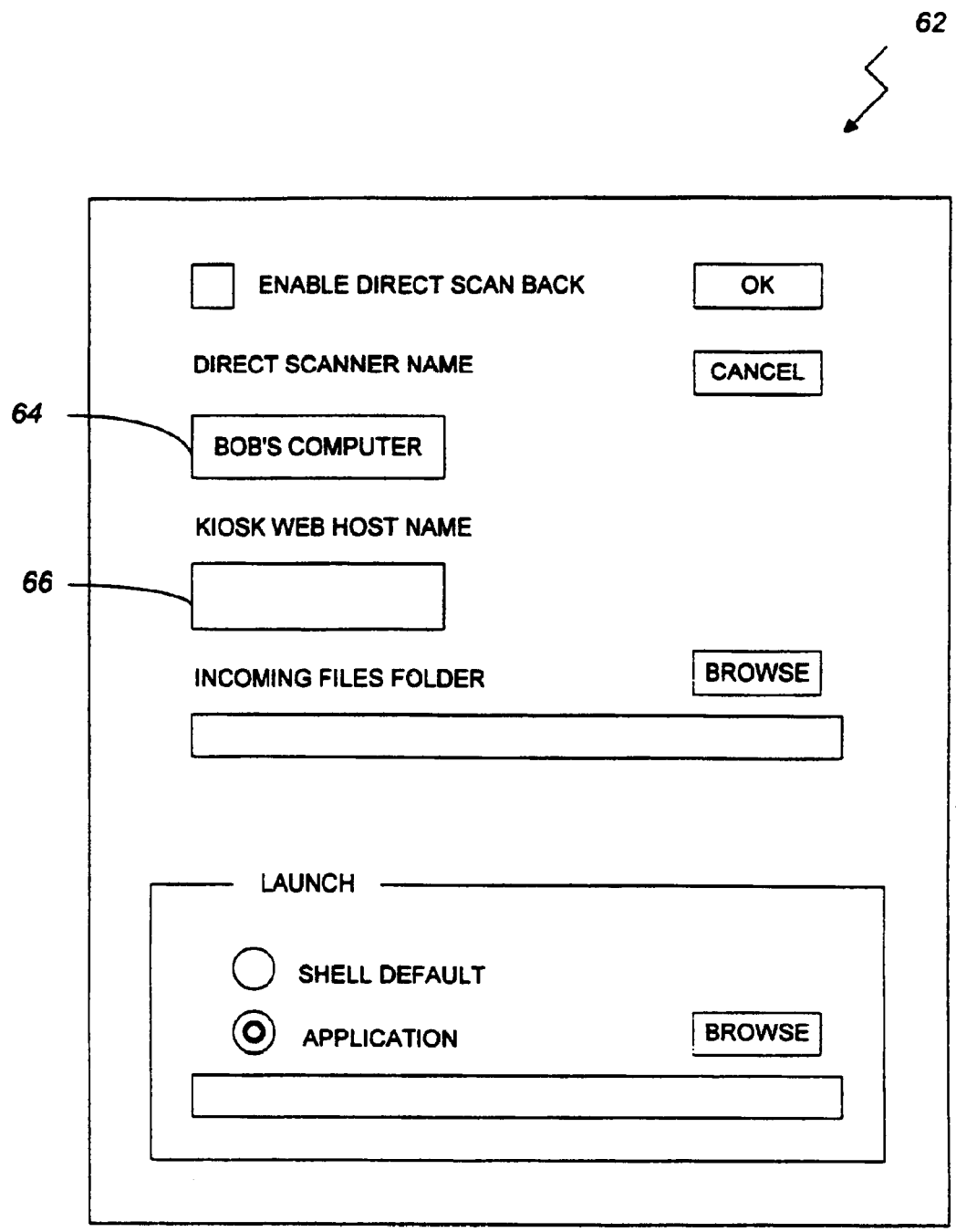
FIG. 3 is a schematic illustration of a graphical user interface at a workstation.

The subscription agent program 60 running on computer 22 sends messages that request registration or deregistration on the name service 50. In addition, the subscription agent program 60 listens for data from the kiosk 30 that is directed to the workstation 20. To install the subscription program 60 on the workstation 20, a user can connect to a computer that supports a data transfer protocol such as HTTP or FTP, download an installation program, and execute the installation program to install the subscription program. The subscription program can be placed in a start-up folder so that it executes each time the computer 22 is turned on. As shown in FIG. 3, the subscription program 60 displays a graphical user interface 62, such as a preferences panel, either during installation or when an appropriate icon displayed by the operating system is clicked. The preferences panel 62 includes a first text box 64 that permits the user to assign a name, i.e., a human language term, to the workstation, and a second text box 66 that permits the user to select a kiosk (if more than one kiosk is connected to the network), or multiple kiosks, to which the subscription program 60 will direct registration requests. In addition, the preferences panel permits the user to specify the response of the subscription program to the receipt of data from the kiosk. For example, the subscription program can be configured to open and send the data to a specified application.

Figure 4:
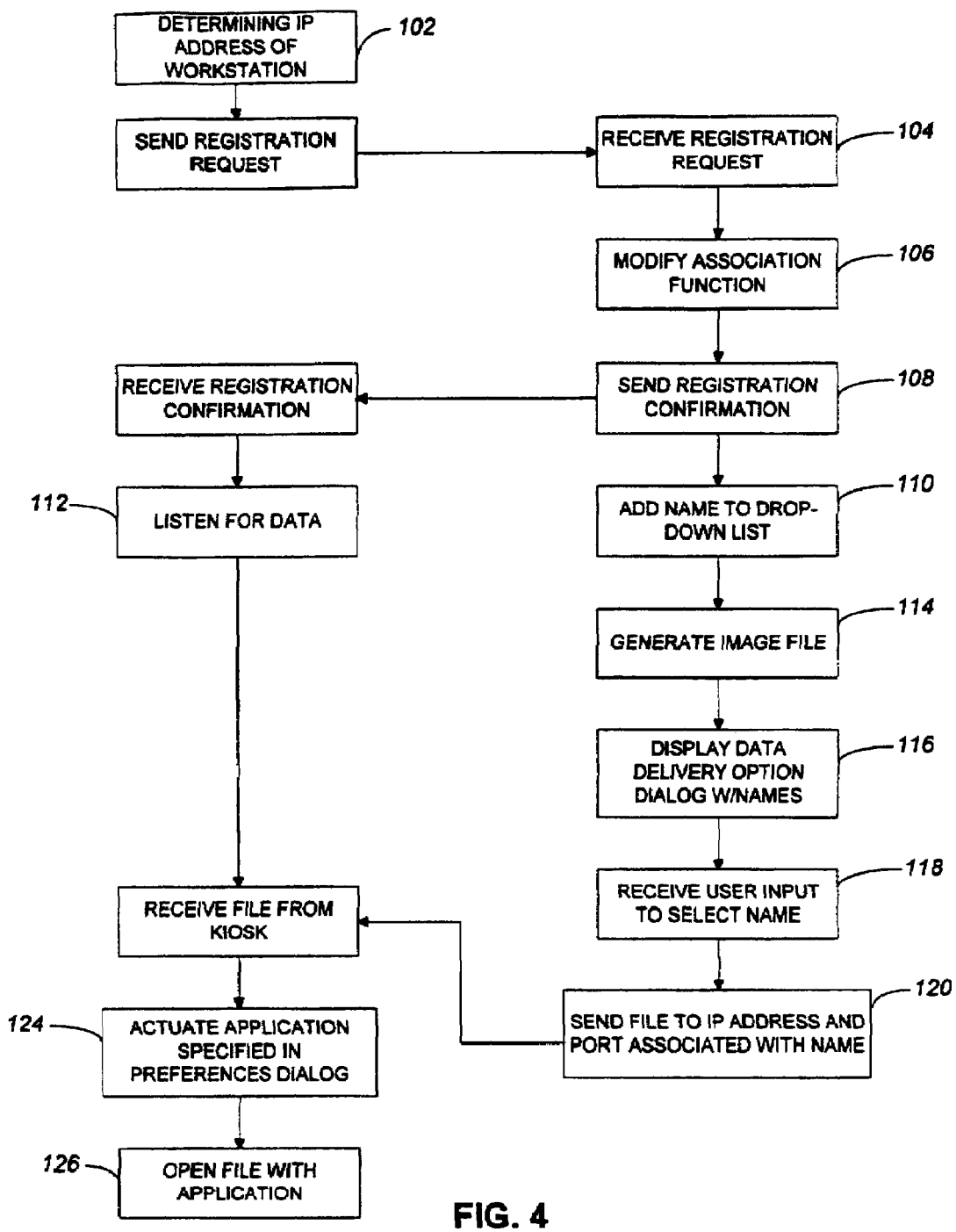
FIG. 4 is a flow chart of the method of the present invention.

As shown in FIG. 4, the method performed by the computer system 10 begins when the workstation is turned on and the subscription program determines the IP address of the workstation (step 102). The subscription program then sends a registration request to the name service at the kiosk (step 104). The registration request includes the human-readable name set in the preferences panel, the IP address of the workstation determined in step 102, and the port number of the subscription program. The name service receives the registration request, and registers the subscription program as a subscriber to the kiosk by modifying the association function (step 106). Once the workstation is registered with the name service, the human-readable name is added to the list of available subscribers in the drop-down list box in the data delivery option dialog at the kiosk (step 110). In addition, the name service sends a message confirming registration back to the workstation (step 108). When the subscription program receives the registration confirmation message, it begins listening for data from the kiosk (step 112). Thus, individual users can install and configure the subscription program and register with the name service without network or kiosk administrative privileges.

In the event that a subscription program requests a name that is already assigned to another subscriber, the name service will send a message declining the registration. The subscription program may then poll the other subscribers to verify whether another workstation using the name is connected to the network. If no subscriber responds to the poll, the subscription program sends another request to the name service, and the workstation is registered. This may occur if a workstation is subject to an abrupt shutdown, i.e., a shutdown that occurs without the opportunity for the workstation to deregister. When the workstation is restarted, it may send a request to register a name that is already on the subscriber list.

If a user has documents that need to be scanned, the user proceeds to the kiosk and places the documents in the scanner. The scanner scans the documents and generates an image file (step 114) and the data delivery program displays the delivery option panel (step 116). The data delivery program receives user input on one of the input devices to select one of the names from the list (step 118), and the data delivery program sends the image file to the IP address and port number associated with the name (step 120) so that the file is received by the subscription program at the appropriate workstation. Once the subscription program has received the data, the program activates the application specified in the preferences panel (step 124) and opens the data using that application (step 126).

Figure 5:
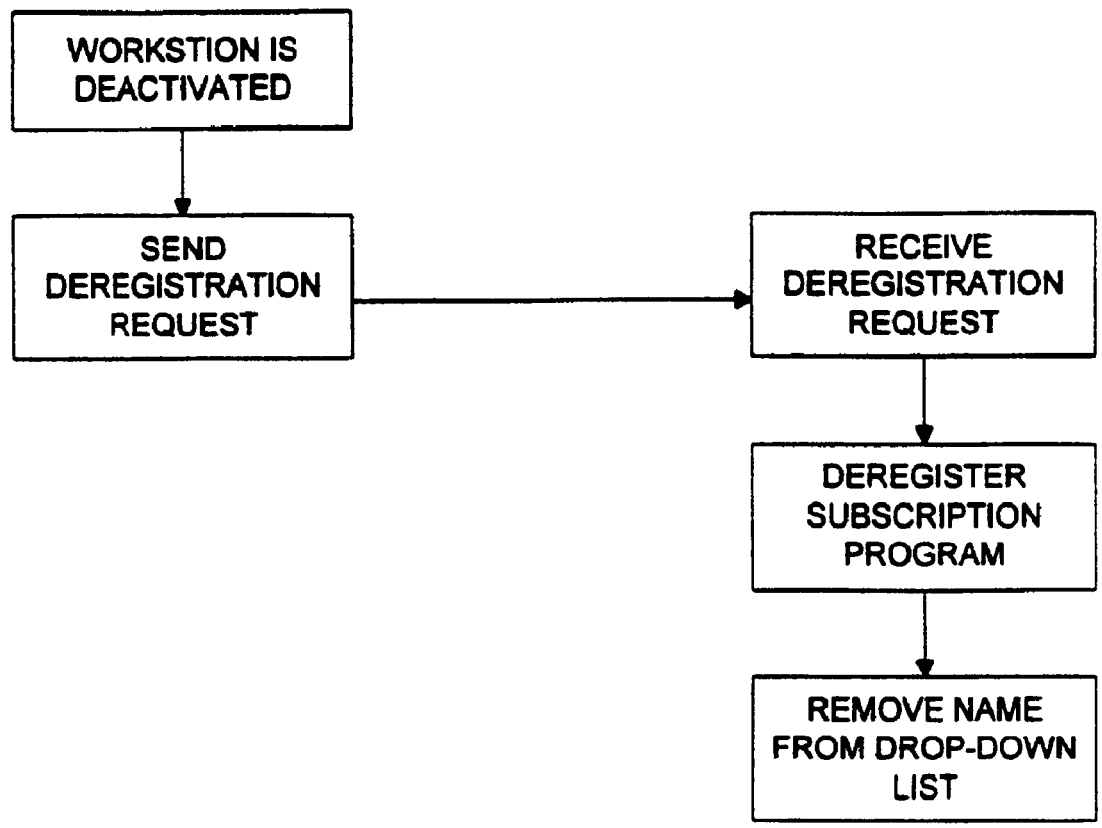
FIG. 5 is a flow chart of the method of deregistering a client from the name service at the kiosk station.

As shown in FIG. 5, when the workstation is turned off, the subscription program sends a deregistration request to the name service at the kiosk as part of the shut-down procedures (step 130). When the name service receives the deregistration request, it automatically deregisters the subscription program (step 132), and the human-readable name is removed from the list of available subscribers in the drop-down list in the data delivery program (step 134). In addition, the name service can periodically poll the subscribers, and subscribers that do not respond can be removed from the subscriber list. This ensures that computers that were subject to an abrupt shutdown and are no longer connected to the network, are automatically removed from the subscriber list.

Consequently, with the exception of the assignment of a fixed IP address for the computer that supports the name service, the installation of the name service and data delivery program at the kiosk computer, and the management of a list of transient workstation clients that can receive data from a scanner, is handled automatically without administrator maintenance. The list box in the delivery option panel displays only the clients on workstations that are currently connected to the network, thus avoiding error messages.

The invention has been described in terms of particular embodiments. Other embodiments are within the scope of the following claims. For example, the CORBA name service could be embedded in the scanner itself.

What is claimed is:

1. A computer-readable medium encoded with a computer program comprising instructions that, when executed, operate to cause a computer to perform operations comprising:
running a name service on a first computer connected to a computer network, the name service being a program that associates a human-readable name with a network location;
receiving a request at the first computer from a subscriber on a second computer connected to the computer network for registration on the name service, the first computer and second computer being located remotely from each other, the request including a name and an associated Internet protocol network address and port number;
receiving data at the first computer from a data resource;
on a display coupled to the first computer and located near the data resource, displaying the name from the request in a list of names;
receiving input from an input device coupled to the first computer, the input selecting the name from the list; and
directing the data from the resource to the Internet protocol network address and port number associated with the selected name so that the data is received by the subscriber on the second computer.

2. The computer-readable medium of claim 1, wherein the instructions further comprise running a subscription program on the second computer that identifies the name service to which a registration request should be sent and the name to be sent in the request.

3. The computer-readable medium of claim 2, wherein the instructions further comprise directing a request for an Internet protocol address from the second computer to a network server, receiving in the second computer the Internet protocol address from the network server.

4. The computer-readable medium of claim 3, wherein the instructions further comprise directing a request for registration from the second computer to the name service identified in the subscription program, the request for registration containing the Internet protocol address received from the network server.

5. The computer-readable medium of claim 4, wherein the step of directing the request is performed automatically when the second computer is started or a user logs on.

6. The computer-readable medium of claim 1, wherein the instructions further comprise running a subscription program on the second computer that receives from the first computer the data from the data resource.

7. The computer-readable medium of claim 6, wherein the subscription program identifies an application on the second computer to which the data should be sent.

8. The computer-readable medium of claim 2, wherein the instructions further comprise receiving the data from the first computer at the second computer, and directing the data to the application on the second computer identified by the subscription program.

9. The computer-readable medium of claim 1, wherein the data resource is a scanner.

10. The computer-readable medium of claim 1, wherein the data resource, display and input device are located at a kiosk station.

11. The computer-readable medium of claim 10, wherein the first computer is located at the kiosk station.

12. The computer-readable medium of claim 10, wherein the second computer is located at a user station.

13. The computer-readable medium of claim 12, wherein a user generates data with the data resource at the kiosk station, selects the name representing the second computer used by the user, and moves to the user station.

14. The computer-readable medium of claim 1, wherein a request to direct data to the second computer is initiated at the data resource.

15. The computer-readable medium of claim 1, wherein the name service is a CORBA name service.

16. A computer-readable medium encoded with a computer program comprising instructions that, when executed, operate to cause a computer to perform operations comprising:
   running a CORBA name service on a first computer connected to a computer network at a kiosk station, the CORBA name service being a Program that associates a human-readable name with a network location;
   running a subscription agent on a second computer connected to the computer network at a user's station, the first computer and second computer being located remotely from each other;
   sending a request from the subscription agent on the second computer to a name service on the first computer for registration on the name service, the request including a name and an associated Internet protocol network address and port number;
   receiving the request at the name service on the first computer;
   receiving data from a data resource connected to the first computer;
   displaying the name from the request in a list of names on a display at the first computer;
   receiving input at the first computer selecting the name from the list;
   directing the data from the resource to the Internet protocol network address and port number associated with the selected name so that the data is received by the subscriber on the second computer;
   opening an application in the second computer designated by the subscription agent; and
   directing the data to the application in the second computer.

17. A computer-readable medium encoded with a computer program comprising instructions that, when executed, operate to cause a computer to perform operations comprising:
   running a name service on a first computer connected to a computer network, the name service being a program that associates a human-readable name with a network location;
   receiving a request at the first computer from a subscriber on a second computer connected to the computer network for registration on the name service, the first computer and second computer being located remotely from each other, the request including a name and an associated Internet protocol network address and port number;
   receiving data at the first computer from a data resource;
   receiving input from an input device coupled to the first computer, the input specifying a name; and
   directing the data from the data resource to the internet protocol network address and port number associated with the specified name so that the data is received by the subscriber on the second computer.

18. The computer-readable medium of claim 17, wherein the instructions further comprise running a subscription program on the second computer that identifies the name service to which a registration request should be sent and the name to be sent in the request.

19. The computer-readable medium of claim 18, wherein the instructions further comprise directing a request for an internet protocol address from the second computer to a network server, receiving in the second computer the internet protocol address from the network server.

20. The computer-readable medium of claim 19, wherein the instructions further comprise directing a request for registration from the second computer to the name service identified in the subscription program, the request for registration containing the internet protocol address received from the network server.

21. The computer-readable medium of claim 20, wherein the step of directing the request is performed automatically when the second computer is started or a user logs on.

22. The computer-readable medium of claim 17, wherein the instructions further comprise running a subscription program on the second computer that receives from the first computer the data from the data resource.

23. The computer-readable medium of claim 22, wherein the subscription program identifies an application on the second computer to which the data should be sent.

24. The computer-readable medium of claim 18, wherein the instructions further comprise receiving the data from the first computer at the second computer, and directing the data to the application on the second computer identified by the subscription program.

25. The computer-readable medium of claim 17, wherein the data resource is a scanner.

26. The computer-readable medium of claim 17, wherein the data resource, display and input device are located at a kiosk station.

27. The computer-readable medium of claim 26, wherein the first computer is located at the kiosk station.

28. The computer-readable medium of claim 26, wherein the second computer is located at a user station.

29. The computer-readable medium of claim 28, wherein a user generates data with the data resource at the kiosk station, specifies the name representing the second computer used by the user, and moves to the user station.

30. The computer-readable medium of claim 17, wherein a request to direct data to the second computer is initiated at the data resource.

31. The computer-readable medium of claim 17, wherein the name service is a CORBA name service.

32. A computer-readable medium encoded with a computer program comprising instructions that, when executed, operate to cause a computer to perform operations comprising:

running a CORBA name service on a first computer connected to a computer network at a kiosk station, the CORBA name service being a program that associates a human-readable name with a network location;

running a subscription agent on a second computer connected to the computer network at a user's station, the first computer and second computer being located remotely from each other;

sending a request from the subscription agent on the second computer to a name service on the first computer for registration on the name service, the request including a name and an associated internet protocol network address and port number;

receiving the request at the name service on the first computer;

receiving data from a data resource connected to the first computer;

receiving input at the first computer, the input specifying a name;

directing the data from the data resource to the internet protocol network address and port number associated with the specified name so that the data is received by the subscriber on the second computer;

opening an application in the second computer designated by the subscription agent; and directing the data to the application in the second computer.

* * * * *